Patented Feb. 10, 1948

2,435,950

UNITED STATES PATENT OFFICE 2,435,950

HYDRAULIC FLUIDS

Harry T. Neher, Bristol, and Frank J. Glavis, Elkins Park, Pa., assignors to Röhm & Haas Company, Philadelphia, Pa., a corporation of Delaware No Drawing. Application February 3, 1945, Serial No. 576,142

8 Claims. (Cl. 252—77)

This invention relates to liquid compositions comprising a quaternary ammonium substituted acrylic resin in solution and, with greater particularity, to hydraulic fluids for transferring pressure and power in the operation of mechanisms.

Although many compositions have heretofore been suggested for use in hydraulic systems, there has heretofore been none which is fully satisfactory in all respects, particularly when considered in conjunction with the operation of hydraulic mechanisms on aircraft. The hydraulic fluids used heretofore have been based either on a mineral oil or upon a vegetable oil, including modified esters made therefrom. This oily component has heretofore been essential in order to provide lubrication of the moving parts in hydraulic systems. Diluents or solvents have been used to adjust the consistency of the fluid to a workable range at average temperatures encountered and to maintain flow at somewhat reduced temperatures. For such purposes organic solvents, usually freely combustible, have been necessary. Ofter a mixture of a low boiling and a high boiling solvent has been used, particularly if a cold test is to be met. Loss of the more volatile solvent, through seepage and/or evaporation, frequently leaves gummy deposits and throws the remaining fluid out of balance in respect to various required properties. These properties are not in all respects restored by "make-up" additions of fluid. The composite fluids heretofore available have been sensitive to water introduced by condensation or by accident. Some of the fluids have suffered both physical and chemical changes during storage and use by reaction of components of the fluids with each other or with the surfaces with which they have been in contact or by action of the mechanism operated therewith.

Fluid compositions have now been discovered which meet the most exacting requirements even of difficult applications, as encountered, for example, in the hydraulic mechanisms of aircraft. Our new compositions need not embody any petroleum oil or an oil of vegetable or animal origin (including esters derived therefrom) which might hydrolyze in a system containing water. Yet they possess excellent lubricating properties, prevent metal to metal contacts, and have wear-preventing properties. They have consistencies suitable for the operation of mechanisms over a wide range of temperatures and can be carried to very low temperatures by suitable selection and proportion of components. The compositions of this invention may be prepared free from the hazards of ready combustibility. They do not form hard, insoluble deposits. They are not sensitive to slight changes in composition, such as might result by vaporization or loss of a component, and permit addition of fresh material or of one of the components thereof without causing separation of a component. They are tolerant to water and, in fact, preferably contain water as a component.

Fluid compositions having the recited properties and advantages comprise solutions of quaternary ammonium polyacrylates and polymethacrylates in which the quaternary nitrogen atom carries four aliphatically bound N-substituents, none of which contains over ten carbon atoms, in liquid short carbon chained dihydric or trihydric aliphatic alcohols, their ethers formed with short chained aliphatic alcohols such as methyl, ethyl, propyl, and butyl alcohols, or mixtures of these solvents. Water may be included as a component of these solutions, serving as a diluent which is noncombustible. Considerable amounts of water may be used to advantage in making up the solutions, regard being given the particular organic solvent used and the lowest temperature to be encountered with a particular composition.

The alcohols and ethers which may be used include ethylene glycol, propylene glycol, trimethylene glycol, 1,3-butylene glycol, and other water-miscible glycols, the normally liquid polyglycols, including diethylene glycol, dipropylene glycol, triethylene glycol, tetraethylene glycol, and polyglycols having mixed alkylene groups, such as hydroxyethoxypropoxyethanol, mono- and dialkyl ethers of these glycols and polyglycols having short chained alkyl ether substituents, such as ethylene glycol methyl ether, methoxymethoxyethanol, diethylene glycol methyl ether, triethylene glycol methyl ether, or other polyethylene glycol methyl ethers, propylene glycol methyl ether, dipropylene glycol methyl ether, and analogous ethyl, propyl, and butyl ethers, ethylene glycol dimethyl ether, diethylene glycol dimethyl ether, triethylene glycol dimethyl ether, tetraethylene glycol dimethyl ether, and analogous dialkyl ethers having ether substituents up to four carbon atoms, glycerine, methyl glycerine, and lower monoalkyl ethers of these trihydric alcohols, such as glycerine monomethyl ether.

One or more of the di- or trihydric alcohols or their ethers may be used in preparing the fluid compositions of this invention. The preferred compositions contain water along with one or more of the glycols and/or ethers. Mixtures, in fact, are often advantageous in increasing the amount of quaternary ammonium polyacrylate or polymethacrylate which is dissolved. If, for example, the solubility of a given quaternary ammonium polymer or copolymer is limited in a given solvent, a combination of solvents (including water) may be selected which will permit incorporation of a greater amount of the polymer.

In the preparation of the compositions of this invention, there are used acrylic resins which are rendered soluble by quaternary ammonium carboxylate groups, the N-substituents of which are aliphatically bound and contain one to ten carbon atoms. The non-ionic substituents of the quaternary ammonium nitrogen (that is, the substituents other than the carboxyl) may thus be aliphatic, arylaliphatic, or alicyclicaliphatic, including such groups as methyl, ethyl, propyl, butyl, amyl, hexyl, octyl, decyl, allyl, methallyl, benzyl, methyl benzyl, phenoxyethyl, phenoxyethoxyethyl, tetrahydrobenzyl, hexadrobenzyl, hydroxyethyl, ethoxyethyl, or the like, the groups being hydrocarbon groups or groups containing a neutral substituent. The solubility of different quaternary ammonium polyacrylates or polymethacrylates varies, depending upon the particular polymer and the number and type of quaternary ammonium groups present. As has been indicated, however, combinations of solvents may be selected which will dissolve sufficient polymer to impart the requisite properties to solutions for use in hydraulic mechanisms for various applications. The solvents alone, that is, without the quaternary ammonium salts of polyacrylic or polymethacrylic acid dissolved therein, lack such properties.

The amount of the polymeric salt or salts required will depend in part upon the particular solvent or combination of solvents selected, the type of mechanism to be operated, and the conditions to be met in operation. The concentration of the polymeric salt or salts and the proportions of solvents are far less critical, however, in the case of the compositions of this invention than in the case of other liquid compositions which have been proposed heretofore. In general, the range of concentration varies from 0.7% to saturation.

The polymeric quaternary ammonium salts may be prepared in several ways. The preferred method for the preparation of quaternary ammonium polyacrylates is described in our related copending application, Serial No. 575,566, filed January 31, 1945, wherein it is shown that polymers containing hydrolyzable esters of acrylic acid and an aliphatic alcohol, particularly an aliphatic primary alcohol of one to four carbon atoms, may be reacted by saponification with solutions of quaternary ammonium hydroxides in methoxymethoxyethanol or methoxyethoxyethanol. Instead of polymers of acrylic esters alone, there may be used copolymers which contain acrylic ester groups which are saponified to the extent necessary to render the quaternary ammonium compound formed therefrom soluble in glycols, glycol ethers, water, or combinations thereof. Copolymers from acrylic esters and other ethenoids, such as styrene, vinyl acetate, methacrylates, butadiene, and the like, are well known.

For the preparation of quaternary ammonium polymethacrylates, it is necessary to resort to some other method. In the most generally satisfactory method, methacrylic acid is polymerized or copolymerized and neutralized with a water-soluble quaternary ammonium hydroxide, the N-substituents of which are likewise aliphatically bound and contain one to ten carbon atoms.

Copolymers may be prepared from methacrylic acid and ethenoids such as styrene, acrylic esters, methacrylic esters, vinyl acetate, butadiene, and other polymerizable organic unsaturates, and solubilized by reaction with a quaternary ammonium hydroxide.

Typical compositions serving as hydraulic fluids are shown in the following examples. In these examples, reference is made to the viscosity-temperature coefficient as "C." This coefficient is given by the relationship $$C_{t_2}^{t_1} = 1 - \frac{\text{viscosity at } t_1}{\text{viscosity at } t_2}$$

This coefficient is of value in making comparisons at such temperatures as 210° F. and 100° F. Comparisons may be also made with solutions having a given fixed viscosity at a selected temperature from differences in viscosities at other temperatures. The slope of the viscosity-temperature curves also gives a means for comparing various solutions of different quaternary ammonium substituted polymers and copolymers. In all of these compositions, the quaternary ammonium substituted polymers or copolymers not only supply suitable consistency and favorable behavior of viscosity with temperature but they also act as lubricants, in spite of the fact that they are not oily substances. They may be supplemented with anticorrosive agents, rust-inhibitors, anti-oxidants, or other film-forming agents. Typical of useful additives are decyl or lauryl phosphites or phosphates.

Typical compositions suitable as hydraulic fluids are shown in the following examples. Parts are by weight.

*Example 1*

(a) A solution of trimethyl benzyl ammonium polyacrylate, prepared by the mixing of equivalent weights of trimethyl benzyl ammonium hydroxide and carefully prepared, pure polyacrylic acid, was made in a mixture of three parts of water and seven parts of ethylene glycol and adjusted to a viscosity of ten centistokes at 210° F. The solution then contained 1.6% of the quaternary ammonium polyacrylate. The viscosity of the solution was 42 centistokes at 100° F., giving a slope of 0.51 on the A. S. T. M. kinematic viscosity chart. The $$C_{100}^{210}$$

value is 0.75. The solution left over night at −105° F. did not solidify and, since it could not be induced to do so by the usual laboratory methods, no melting point could be determined.

(b) A solution of trimethyl benzyl ammonium polyacrylate, prepared by reaction of the corresponding quaternary ammonium hydroxide in methoxymethoxyethanol with an aqueous suspension of methyl acrylate, was diluted with a mixture of three parts of water and seven parts of ethylene glycol to a concentration of 0.7% of polymer. At this concentration, the viscosity was 10 centistokes at 210° F. and 49 centistokes at 100° F., giving an A. S. T. M. slope of 0.56. The value of $$C_{100}^{210}$$

is 0.80. The solution did not solidify when maintained at −105° F. for an extended period of time.

(c) A solution of trimethyl benzyl ammonium polyacrylate was prepared by saponification of an aqueous suspension of polymeric methyl acrylate with a solution of trimethyl benzyl ammonium hydroxide prepared from the corresponding chloride in methoxyethoxyethanol. The quaternary ammonium polyacrylate solution was diluted with a mixture of one part of water and one part of methoxyethoxyethanol to a solids content of 1.7%. This solution gave a viscosity of 10 centistokes at 210° F. and of 39 centistokes at 100° F., giving an A. S. T. M. slope of 0.49. The $C^{210}_{100}$ value is 0.75. The solution did not solidify when kept at —105° F. over night.

The above preparation was repeated with a different preparation of trimethyl benzyl ammonium hydroxide and another dispersion of polymeric methyl acrylate. The product obtained was adjusted with the above solvent mixture to give solutions having 1.9% of solids, which had viscosities of 10 centistokes at 210° F. and of 43 centistokes at 100° F., giving an A. S. T. M. slope of 0.52.

*Example 2*

A solution of trimethyl benzyl ammonium polymethacrylate was prepared by reacting polymethacrylic acid and trimethyl benzyl ammonium hydroxide in methoxyethoxyethanol and taking the product up with water and ethylene glycol. The solvent medium consisted of 43 parts of water, 53 parts of ethylene glycol, and four parts of methoxyethoxyethanol. A solution of 5% of the polymer in this solvent medium gave a solution having a viscosity of 5.8 centistokes at 130° F. and 211 centistokes at —25° F. The melting point was about —30° F.

*Example 3*

(a) A solution of tetraethanol ammonium polyacrylate was prepared by the reaction of polyacrylic acid with tetraethanol ammonium hydroxide and dilution with ethylene glycol and water in the ratio of 7 to 3. The solution adjusted to 2.4% of solids gave a viscosity of 10 centistokes at 210° F. and 43 centistokes at 100° F., giving an A. S. T. M. slope of 0.52. The solution was not solidified when kept at —105° F. over night.

(b) Another solution of tetraethanol ammonium polyacrylate was prepared by saponification of polymeric methyl acrylate and dilution with a water and ethylene glycol mixture (3:7). At 7% solids, this solution gave a viscosity of 14.3 centistokes at 210° F. and 77.8 centistokes at 100° F., giving an A. S. T. M. slope of 0.53. The $C^{210}_{100}$ value is 0.82.

(c) A tetraethanol ammonium polyacrylate was taken up in a solvent consisting of one part of water and one part of methoxyethoxyethanol. At a solids content of 9.1%, the viscosity was 10 centistokes at 210° F. and 43 centistokes at 100° F., giving an A. S. T. M. slope of 0.52.

(d) Another preparation of tetraethanol ammonium polyacrylate (from polymeric methyl acrylate in aqueous dispersion and the corresponding hydroxide in methoxymethoxyethanol) gave solutions in a medium of 45% of water and 55% of ethylene glycol which, at 3.8% of solids, had viscosities of 10 centistokes at 130° F. and 1100 centistokes at —40° F., corresponding to an A. S. T. M. slope of 0.65.

(e) A solution of tetraethanol ammonium polymethacrylate was made in a solvent composed of 45 parts of water and 55 parts of ethylene glycol. The polymethacrylate was prepared from tetraethanol ammonium hydroxide and polymethacrylic acid in equivalent amounts. At a solids content of 12.5%, the solution had a viscosity of 10 centistokes at 130° F., and of 1200 centistokes at —40° F., giving an A. S. T. M. slope of 0.65. The solution did not solidify when kept over night at —105° F.

*Example 4*

(a) A solution of trimethyl ethanol ammonium hydroxide in methoxyethoxyethanol was reacted with an aqueous dispersion of polymeric methyl acrylate. The resulting solution was adjusted to a solids content of 2.6% in a medium of half water and half methoxyethoxyethanol. It had a viscosity of 10 centistokes at 210° F. and of 45 centistokes at 100° F., giving an A. S. T. M. slope of 0.53.

(b) A solution containing 1.4% of trimethyl ethanol ammonium polyacrylate in a solvent of 45% of water and 55% of ethylene glycol had a viscosity of 10 centistokes at 130° F. and of 950 centistokes at —40° F. The melting point of the solution was about —50° F.

(c) A preparation of trimethyl ethanol ammonium polyacrylate from an aqueous dispersion of polymeric methyl acrylate and trimethyl ethanol ammonium hydroxide prepared in methoxymethoxyethanol was extended to a concentration of 4% of the polymer. The composition of the solvent was then 43 parts of water, 53 parts of ethylene glycol, and four parts of methoxymethoxyethanol. This solution had viscosities of 10 centistokes at 130° F. and 1538 centistokes at —40° F. It did not solidify after being held at —105° F. over night.

(d) Trimethyl ethanol ammonium polymethacrylate was prepared by reacting the corresponding hydroxide with polymethacrylic acid. The reaction product was taken up in ethylene glycol and water to give a solution of 2.2% polymer in a solvent composed of 45% of water and 55% of glycol. The viscosity was 10 centistokes at 130° F. and 1000 at —40° F. The melting point was —60° F.

*Example 5*

An aqueous dispersion of polymeric methyl acrylate was saponified with octyl trimethyl ammonium hydroxide in methoxymethoxyethanol and adjusted to a concentration of 5.8% of polymer with a mixture of 45 parts of water and 55 parts of ethylene glycol. This solution had a viscosity of 2.9 centistokes at 130° F. and of 403 centistokes at —40° F.

*Example 6*

An aqueous dispersion of polymeric methyl acrylate was saponified with triethyl benzyl ammonium hydroxide in methoxymethoxyethanol and adjusted to a concentration of 3.7% of polymer with a mixture of 45 parts of water and 55 parts of ethylene glycol. This solution had a viscosity of 10 centistokes at 130° F. and of 1600 centistokes at —40° F.

*Example 7*

A solution was prepared containing 7% of trimethyl benzyl ammonium polyacrylate in a mixture of three parts of water and seven parts of butoxyethoxyethanol. Its viscosity was 1.8 centistokes at 210° F. and 7.9 centistokes at 100° F.

Example 8

(a) Pure polyacrylic acid was reacted with trimethyl benzyl ammonium hydroxide in an equivalent amount and the resulting quaternary ammonium polyacrylate taken up in a mixture of propylene glycol and water in a ratio of 55 to 45. A 7.2% solution of the polyacrylate had a viscosity of 10 centistokes at 210° F. and of 42 centistokes at 100° F., giving a slope of 0.51 and a value of $$C^{210}_{100}$$

of 0.76. The melting point was −35° F.

(b) Another lot of trimethyl benzyl ammonium polyacrylate from saponification of dispersed polymethyl acrylate was taken up in a 1 to 1 mixture of dipropylene glycol and water. At a solids concentration of 1.85%, the resulting solution had a viscosity of 10 centistokes at 210° F. and of 54 centistokes at 100° F., giving an A. S. T. M. slope of 0.58 and a $$C^{210}_{100}$$

value of 0.82. The melting point of this solution was −10° F.

Example 9

(a) A solution of trimethyl benzyl ammonium polyacrylate was made in a 50:50 mixture of dimethoxytetraethylene glycol and water and adjusted to a consistency suitable for a hydraulic fluid. At 2.2% of solids, the solution had a viscosity of 10 centistokes at 210° F. and of 42 centistokes at 100° F., giving an A. S. T. M. slope of 0.51 and a $$C^{210}_{100}$$

value of 0.76. The melting point was −30° F.

(b) Another lot of trimethyl benzylammonium polyacrylate was dissolved in a solution composed of equal parts of dimethoxytetraethylene glycol, ethylene glycol, and water. At a concentration of polyacrylate of 1.6%, the solution had a viscosity of 10 centistokes at 210° F. and of 48 centistokes at 100° F., giving an A. S. T. M. slope of 0.55 and a $$C^{210}_{100}$$

value of 0.79. The melting point was below −105° F.

Example 10

(a) Trimethyl benzyl ammonium polyacrylate was dissolved in a mixture of equal parts of ethylene glycol, water, and methoxyethoxyethanol. At 2% solids, the resulting solution had a viscosity of 10 centistokes at 210° F. and of 50 centistokes at 100° F., giving an A. S. T. M. slope of 0.56. The solution remained fluid when the temperature was lowered even to −100° F. over an extended period of time.

(b) A solution of trimethyl benzyl ammonium polyacrylate was made in a solution composed of 10 parts of ethylene glycol, 48 parts of water, and 22 parts of methoxyethoxyethanol. At a solids concentration of 7.5%, the solution had a viscosity of 10 centistokes at 210° F. and of 37.5 centistokes at 100° F., giving an A. S. T. M. slope of 0.48 and a $$C^{210}_{100}$$

value of 0.73.

Example 11

(a) A solution of trimethyl benzyl ammonium polyacrylate was made in a solvent composed of equal parts of tetraethylene glycol, methoxyethoxyethanol, and water. At a solids concentration of 1.9%, the solution obtained had a viscosity of 10 centistokes at 210° F. and of 53 centistokes at 100° F., giving an A. S. T. M. slope of 0.58. The solution remained fluid when maintained at −105° F. over an extended period of time.

(b) A solution of trimethyl benzyl ammonium polyacrylate was made in a solvent of equal parts of the diethyl ether of diethylene glycol, methoxyethoxyethanol, and water. At a solids concentration of 4.5%, the resulting solution had viscosities of 10 centistokes at 210° F. and of 70 centistokes at 100° F., giving an A. S. T. M. slope of 0.65. The solution remained fluid when stored at −105° F. over an extended period of time.

(c) A solution of trimethyl benzyl ammonium polyacrylate was made in a solvent medium consisting of 50 parts of ethylene glycol, 5 parts of methoxyethoxyethanol, and 40 parts of water. At 1.7% of solids, the solution had a viscosity of 10 centistokes at 130° F. and a viscosity of 1025 centistokes at −40° F. The melting point was about −60° F.

(d) A preparation of trimethyl benzyl ammonium polyacrylate from polyacrylic acid and the corresponding hydroxide in methoxyethoxyethanol was taken up in a solvent composed of about equal parts of ethylene glycol, water, and methoxyethoxyethanol. At a solids content of 5.7%, the solution had a viscosity of 10 centistokes at 210° F. and of 62 centistokes at 100° F., giving an A. S. T. M. slope of 0.62. The solution remained fluid when stored at −105° F. for an extended period of time.

Example 12

A solution of trimethyl benzyl ammonium polyacrylate was made in a solvent consisting of 55 parts of ethylene glycol, 37 parts of water, and 8 parts of methoxyethoxyethanol. At 2.45% of solids, the solution gave a viscosity of 10 centistokes at 130° F. and of 1050 centistokes at −40° F. The freezing point was −75° F.

Example 13

Trimethyl ethanol ammonium polyacrylate was prepared by the hydrolysis of polymeric methyl acrylate with the corresponding hydroxide. The resulting polymer was taken up in solvents suitable for use in the hydraulic fluids of this invention.

(a) A 3.1% solution in a mixture of equal parts of ethylene glycol, water, and methoxyethoxyethanol had a viscosity of 10 centistokes at 210° F. and of 48 centistokes at 100° F., giving an A. S. T. M. slope of 0.55. The solution remained fluid at −105° F.

(b) A 4.2% solution in a mixture of equal parts of dimethyl ether of tetraethylene glycol, water, and ethylene glycol had a viscosity of 10 centistokes at 210° F. and of 55 centistokes at 100° F., giving an A. S. T. M. slope of 0.59. The solution remained fluid at −105° F.

(c) A 3.0% solution in equal parts of glycerine, methoxyethoxyethanol, and water had a viscosity of 10 centistokes at 210° F. and of 60 centistokes at 100° F. giving an A. S. T. M. slope of 0.61. The solution remained fluid at −105° F.

Example 14

(a) A 14.5% solution of tetraethanol ammonium polyacrylate was made in a solvent composed of 15 parts of the dimethyl ether of tetraethylene glycol, 35 parts of water, and 15 parts of ethylene glycol. It had a viscosity of 10 centistokes at 210° F. and of 180 centistokes at 100° F. The melting point was −30° F.

(b) An 8.3% solution of tetraethanol ammonium polyacrylate was made in a solvent composed of equal parts of glycerine, methoxyethoxyethanol, and water. Its viscosity at 210° F. was 10 centistokes and at 100° F. was 68 centistokes. The solution remained fluid when stored at −105° F.

Example 15

A solution of trimethyl benzyl ammonium polyacrylate was made in a solvent composed of equal parts of dimethoxy tetraethylene glycol, ethylene glycol, and water. The concentration was adjusted to give a suitable consistency for hydraulic fluids. This solution exhibited definite lubricating properties in a bearing. The addition to this solution of 3% of triethanolamine phosphate, formed from equivalent amounts of triethanolamine and phosphoric acid, increased the lubricating properties to an extent sufficient to prevent seizure within the limits of the testing mechanism.

A similar test made with a solution of the same polyacrylate in water showed that whereas the test bearing would seize almost at once with water, the solution of polyacrylate permitted a definite load to be imposed thereon. The permissible load was greater when triethanolamine phosphate was added to the solution.

The compositions of this invention, solutions of quaternary ammonium polyacrylates or polymethacrylates in short carbon chained dihydric and trihydric alcohols, their ethers, water, and mixtures thereof, are highly useful as hydraulic fluids for transmitting pressure and operating mechanisms. The properties of these compositions recommend them for installations having exacting requirements. The compositions can be prepared in a non-combustible form. They provide lubrication without the use of oils or oil-like materials, yet may be fortified with additives, if desired. They provide consistencies which are suitable for all types of hydraulic mechanisms and have highly favorable viscosity-temperature relationships. They may be prepared from liquids which in themselves have viscosities too low for application in hydraulic mechanisms. Mixtures of the non-viscous liquids with the polymers of this invention have suitable viscosities throughout the operative range, and, at the same time, the liquids retain their low freezing points. In some cases, the polymers actually depress the freezing point of the fluid. The new compositions thus have the favorable consistencies of more viscous liquids which, however, by themselves have freezing points too high for satisfactory use.

Our new compositions are compatible with water and are not critical as to composition. The solutions do not yield gummy, insoluble deposits or hard deposits. If the quaternary ammonium polymers are permitted to deposit, they form soft, soluble residues which do not interfere in any way with the operation of a mechanism. They may be prepared with a wide choice of combinations of glycols and their ethers and readily adapted to give optimum results with any given mechanism.

We claim:

1. A hydraulic fluid consisting essentially of (a) 0.7% by weight up to saturation of an acrylic resin which is rendered water-soluble by acrylic carboxylate groups in the form of quaternary ammonium salt groups, the four non-ionic substituents of the quaternary nitrogen atom thereof being selected from members of the class consisting of neutral aliphatic, acrylaliphatic, and alicyclicaliphatic groups containing not over ten carbon atoms each bound to the nitrogen at a saturated carbon atom thereof in an open chain, and (b) a fluid medium in which said acrylic resin is dissolved in a proportion sufficient to impart lubricating properties and substantial viscosity to the fluid, said fluid medium consisting essentially of a water-miscible liquid from the class consisting of saturated aliphatic dihydric alcohols having a chain of two to three carbon atoms between the hydroxyl groups thereof, saturated aliphatic dihydric ether alcohols containing one to three ether oxygen atoms and having alkylene chains of two to three carbon atoms, saturated trihydric aliphatic alcohols of three to four carbon atoms, and ethers formed from any of said alcohols and a saturated aliphatic monohydric alcohol of one to four carbon atoms, aqueous solutions thereof, mixtures thereof, and aqueous mixtures thereof.

2. A hydraulic fluid consisting essentially of (a) 0.7% by weight up to saturation of an acrylic resin which is rendered water-soluble by acrylic carboxylate groups in the form of quaternary ammonium salt groups, the four non-ionic substituents of the quaternary nitrogen atom thereof being selected from members of the class consisting of neutral aliphatic, arylaliphatic, and alicyclicaliphatic groups containing not over ten carbon atoms each bound to the nitrogen at a saturated carbon atom thereof in an open chain, and (b) a liquid in which said acrylic resin is dissolved in a proportion sufficient to impart lubricating properties and substantial viscosity to the fluid, said liquid consisting essentially of a water-miscible ether alcohol of the formula $$RO(R'O)_xR'OH$$

wherein R is an alkyl group of one to four carbon atoms, R' is an alkylene group of two to three carbon atoms, and $x$ is a number from zero to three.

3. A hydraulic fluid consisting essentially of (a) 0.7% by weight up to saturation of an acrylic resin which is rendered water-soluble by acrylic carboxylate groups in the form of quaternary ammonium salt groups, the four non-ionic substituents of the quaternary nitrogen atom thereof being selected from members of the class consisting of neutral aliphatic, arylaliphatic, and alicyclicaliphatic groups containing not over ten carbon atoms each bound to the nitrogen at a saturated carbon atom thereof in an open chain, and (b) a liquid medium in which said acrylic resin is dissolved in a proportion sufficient to impart lubricating properties and substantial viscosity to the fluid, said liquid medium consisting essentially of water and a water-miscible alkylene glycol of two to three carbon atoms.

4. A hydraulic fluid consisting essentially of 0.7% by weight up to saturation of an acrylic resin which is rendered water-soluble by acrylic carboxylate groups in the form of quaternary ammonium salt groups, the four non-ionic substituents of the quaternary nitrogen atom thereof being selected from members of the class consisting of neutral aliphatic, arylaliphatic, and alicyclic-aliphatic groups containing not over ten carbon atoms each bound to the nitrogen at a saturated carbon atom thereof in an open chain, dissolved in a mixture of ethylene glycol and water, the proportion of said polyacrylate in said mixture imparting to the resulting solution lubricating properties and substantial viscosity.

5. A hydraulic fluid consisting essentially of 0.7% by weight up to saturation of trimethyl benzyl ammonium polyacrylate and a liquid in which said polyacrylate is dissolved in a proportion sufficient to impart lubricating properties and substantial viscosity to the fluid, said liquid consisting essentially of a water-miscible ether alcohol of the formula $$RO(R'O)_xR'OH$$

wherein R is an alkyl group of one to four carbon atoms, R' is an alkylene group of two to three carbon atoms, and $x$ is a number from zero to three.

6. A hydraulic fluid consisting essentially of 0.7% by weight up to saturation of trimethyl benzyl ammonium polyacrylate dissolved in butoxyethoxyethanol in a proportion sufficient to impart to the resulting fluid lubricating properties and substantial viscosity.

7. A hydraulic fluid consisting essentially of 0.7% by weight up to saturation of trimethyl benzyl ammonium polyacrylate dissolved in a liquid medium of ethylene glycol and water in a proportion sufficient to impart to the resulting fluid lubricating properties and substantial viscosity.

8. A hydraulic fluid consisting essentially of 0.7% by weight up to saturation of trimethyl ethanol ammonium polyacrylate dissolved in a liquid medium of ethylene glycol and water in a proportion sufficient to impart to the resulting fluid lubricating properties and substantial viscosity.

HARRY T. NEHER.
FRANK J. GLAVIS.

REFERENCES CITED

The following references are of record in the file of this patent:

UNITED STATES PATENTS

| Number | Name | Date |
|---|---|---|
| 2,078,256 | Lieber | Apr. 27, 1937 |
| 2,091,627 | Bruson | Aug. 31, 1937 |
| 2,104,796 | Dietrich | Jan. 11, 1938 |
| 2,146,209 | Graves | Feb. 7, 1939 |
| 2,162,454 | Guthmann | June 13, 1939 |